United States Patent
Morita

(10) Patent No.: US 7,461,341 B2
(45) Date of Patent: Dec. 2, 2008

(54) STRUCTURED DOCUMENT DISPLAY PROCESSOR, METHOD FOR PROCESSING DISPLAY OF STRUCTURED DOCUMENT, AND PROGRAM FOR DISPLAYING STRUCTURED DOCUMENT

(75) Inventor: Masanori Morita, Fussa (JP)

(73) Assignee: Seiko Epson Corporation, Tokyo (JP)

( * ) Notice: Subject to any disclaimer, the term of this patent is extended or adjusted under 35 U.S.C. 154(b) by 469 days.

(21) Appl. No.: 10/953,416

(22) Filed: Sep. 30, 2004

(65) Prior Publication Data

US 2005/0091590 A1    Apr. 28, 2005

(30) Foreign Application Priority Data

Oct. 6, 2003    (JP)    ............................ 2003-347125

(51) Int. Cl.
 G06F 17/00    (2006.01)
(52) U.S. Cl. ........................................ 715/245; 715/234
(58) Field of Classification Search ................ 715/500, 715/513, 234, 243, 244, 245
 See application file for complete search history.

(56) References Cited

U.S. PATENT DOCUMENTS

| 5,499,331 | A  | * | 3/1996  | Hayashi et al. | ............. | 715/513  |
| 6,725,423 | B1 | * | 4/2004  | Muramoto et al.| ..........    | 715/513  |
| 7,143,111 | B2 | * | 11/2006 | Yamada         | ...................| 707/104.1|
| 2002/0194227 | A1 | * | 12/2002 | Day et al.  | ...................| 707/523  |
| 2004/0225960 | A1 | * | 11/2004 | Parikh et al.| ................| 715/517  |

OTHER PUBLICATIONS

Badros, Greg J., et al, "Constraint Cascading Style Sheets for the Web", Proceedings of the 12th Annual Symposium on User Interface Software and Technology UIST '99, Nov. 1999, pp. 73-82.*
Graham, Susan L., et al, "The Proteus Presentation System", ACM SIGSOFT Software Engineering Notes, Proceedings of the Fifth ACM SIGSOFT Symposium on Software Development Environments SDE 5, vol. 17, Issue 5, Nov. 1992, pp. 130-138.*
Weitzman, L., et al, "Automatic Presentation of Multimedia Documents Using Relational Grammars", Proceedings of the Second ACM International Conference on Multimedia, Oct. 1994, pp. 443-451.*
Bert Boss; Cascading Style Sheets Home Page; Nov. 4, 2004.
CSS Print Profile; W3C Candidate Recommendation; Feb. 25, 2004.
"Cascading Style Sheets, Level 2 Revision 1 CSS 2.1 Specification"; W3C Candidate Recommendation Feb. 25, 2004; http://www.w3.org/TR/CSS21/page.html.

* cited by examiner

*Primary Examiner*—Laurie Ries
(74) *Attorney, Agent, or Firm*—Oliff & Berridge PLC

(57) ABSTRACT

A structured document display processor used in a display device for displaying a structured document based on a style definition, the structured document having at least one element includes. A page number calculating unit for calculating a page character number based on information used for determining the page character number. The information for determining the page character number is defined in the style definition, and the page character number indicates the number of characters which can be accommodated in a single page. Also included is a cumulative character count calculating unit for calculating a cumulative character count which is a total character count from the beginning of the structured document to a requested element which is requested to be displayed, and a requested page determining unit for determining a page containing the requested element based on the page character number and the cumulative character count.

4 Claims, 8 Drawing Sheets

FIG.3

| ELEMENT | AREA SIZE | ADJUSTED CHARACTER NUMBER |
|---|---|---|
| H1 | 3 LINES/1 COLUMN | 15 CHARACTERS |
| H2 | 3 LINES/1 COLUMN | 10 CHARACTERS |
| img | 5 LINES/1 COLUMN | 25 CHARACTERS |

STRUCTURED DOCUMENT DISPLAY PROCESSOR, METHOD FOR PROCESSING DISPLAY OF STRUCTURED DOCUMENT, AND PROGRAM FOR DISPLAYING STRUCTURED DOCUMENT

Priority is claimed on Japanese Patent Application No. 2003-347125, filed Oct. 6, 2003, the content of which is incorporated herein by reference.

BACKGROUND OF THE INVENTION

1. Field of the Invention

The present invention relates to a structured document display processor used in a display device for displaying a structured document using a style definition, to a method for processing a display of a structured document, and to a program for displaying a structured document.

2. Description of Related Art

Efforts have been made to display structured documents, such as XML (extensible markup language) documents, on a mobile display medium. When displaying a structured document on such a display medium page by page using a conventional method, a formatting processing (layout processing) is required to be carried out on the structured document from the beginning thereof. Thus, in order to display a particular page on the display medium, the formatting processing (layout processing) must be carried out from the beginning of the structured document to determine the contents to be displayed on the particular page. For example, in order to display and print only the last page of a 50-page document, the layout processing should be carried out on all of the pages from the first page to the fiftieth page. The desired page becomes available to print only after the layout processing has been completed on all of these pages.

Layouts of such structured documents are defined using various techniques, and among them is a technique called "style sheet" (specifications of style sheet is available from http://www.w3.org/Style/CSS, which was available as of Sep. 24, 2003).

However, the above-described technique has shortcomings. First, when a user desires to see a page which is located near the end of the document, the layout processing should be executed from the beginning of the structured document to obtain the content of the desired page. As a result, the user may need to wait for the requested page to be displayed on a display medium. Although the above-mentioned style sheet specification teaches how to define style sheets, it does not provide any solution to the problem mentioned above.

SUMMARY OF THE INVENTION

The present invention was conceived to solve the above-mentioned problem, and an object thereof is to provide a program and a method for displaying a structured document, and a structured document display processor which can enhance the speed of layout processing when a structured document is output on a display medium.

To solve the problems described above, the present invention is directed to a structured document display processor used in a display device for displaying a structured document based on a style definition, the structured document having at least one element, including: a page number calculating unit for calculating a page character number based on information used for determining the page character number, the information for determining the page character number being defined in the style definition, the page character number indicating the number of characters which can be accommodated in a single page; a cumulative character count calculating unit for calculating a cumulative character count which is a total character count from the beginning of the structured document to a requested element which is requested to be displayed; a requested page determining unit for determining a page containing the requested element based on the page character number obtained by the page number calculating unit and the cumulative character count obtained by the cumulative character count calculating unit; a subtree extracting unit for examining the structured document and extracting a subtree corresponding to the page containing the requested element determined by the requested page determining unit; and a layout processing unit for determining a layout of the page containing requested element according to the subtree extracted by the subtree extracting unit and the style definition.

According to the present invention, a subtree of a page which contains the desired part can be extracted as a subtree by identifying the number of characters which can be contained from a style description of the structured document, and calculating the number of characters included in the structured document. Accordingly, the desired part can be displayed after performing the page layout processing on only the desired page, thus, time until the desired page is displayed will be reduced, and speed of displaying of the page can be enhanced.

According to the present invention, in the above-described structured document display processor, a part of the at least one element may be displayed in a body text area, the style definition may include a definition of a layout area in which another part of the at least one element is displayed differently from the body text, and a size of the layout area may be expressed in terms of a size of characters displayed in the body text area.

According to the present invention, since the size of the layout area is defined with respect to the size of the body text area, it becomes possible to count the number of characters contained in layout areas on non-display pages. Accordingly, even when a structured document includes an element which is to be displayed differently from the body text, the desired page can be displayed without determining page layout from the first page of the structured document. Thus, time until the desired page is displayed will be reduced, and speed of displaying of the page can be enhanced.

The present invention is also directed to a method for structured document display processor used in a display device for displaying a structured document based on a style definition, the structured document having at least one element, including the steps of: calculating a page character number based on information used for determining the page character number, the information for determining the page character number being defined in the style definition, the page character number indicating the number of characters which can be accommodated in a single page; calculating a cumulative character count which is a total character count from the beginning of the structured document to a requested element which is requested to be displayed; determining a page containing the requested element based on the page character number and the cumulative character count; examining the structured document and extracting a subtree corresponding to the page containing the requested element; and determining a layout of the page containing requested element according to the subtree extracted by the subtree extracting unit and the style definition.

The present invention is also directed to a program for structured document display processor used in a display device for displaying a structured document based on a style definition, the structured document having at least one element, the program being executed by a computer, including the steps of: calculating a page character number based on information used for determining the page character number, the information for determining the page character number being defined in the style definition, the page character number indicating the number of characters which can be accommodated in a single page; calculating a cumulative character count which is a total character count from the beginning of the structured document to a requested element which is requested to be displayed; determining a page containing the requested element based on the page character number and the cumulative character count; examining the structured document and extracting a subtree corresponding to the page containing the requested element; and determining a layout of the page containing requested element according to the subtree extracted by the subtree extracting unit and the style definition.

BRIEF DESCRIPTION OF THE DRAWINGS

FIG. 3 is a table listing an example of a description of a layout area;

DETAILED DESCRIPTION OF THE INVENTION

A structured document display processor according to an embodiment of the present invention will be explained with reference to the drawings.

Figure 1:
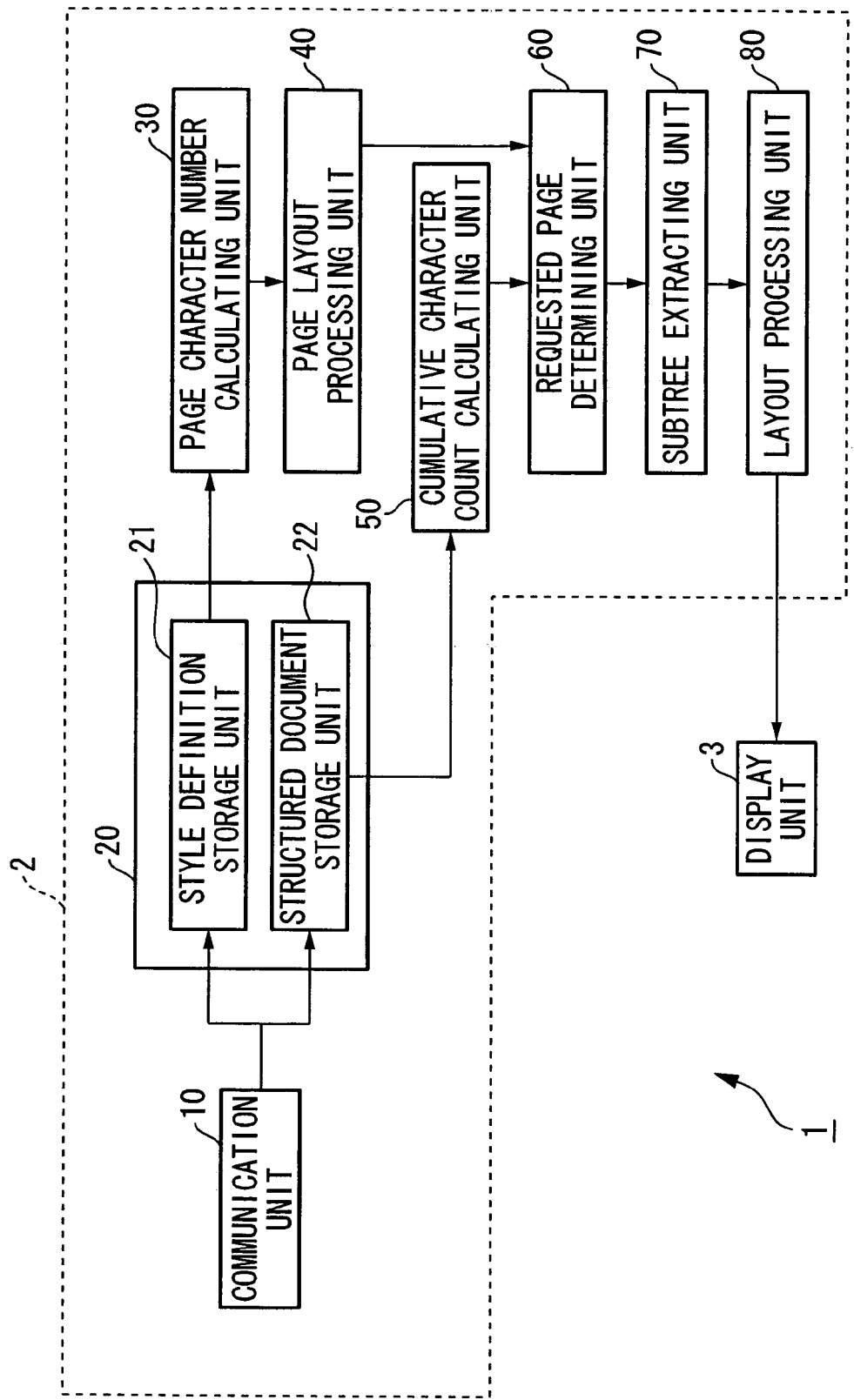
FIG. 1 is a schematic block diagram illustrating a configuration of a viewer terminal 1 as an example of a display processing device employing a structured document display processor according to an embodiment of the present invention.

FIG. 1 is a schematic block diagram illustrating a configuration of a viewer terminal 1 as an example of a display processor employing a structured document display processor according to an embodiment of the present invention.

In this figure, the viewer terminal 1 includes a structured document display processor 2 and a display unit 3. A user can carry this viewer terminal 1 around for mobile use.

The structured document display processor 2 includes a communication unit 10 for receiving structured documents and style definition to be displayed on the display unit 3 via a network connection, such as the Internet or a local area network (LAN), and storing to a storage unit 20.

The storage unit 20 may include, for example, a style definition storage unit 21 and a structured document storage unit 22, and includes a non-volatile or a volatile memory. The style definition storage unit 21 stores style definitions. The style definition may be for example, a style sheet definition, and describes information to determine a page structure of a structured document. In this example, the style definition describes information which can be used to determine the number of characters which can be accommodated in one page.

Figure 2:
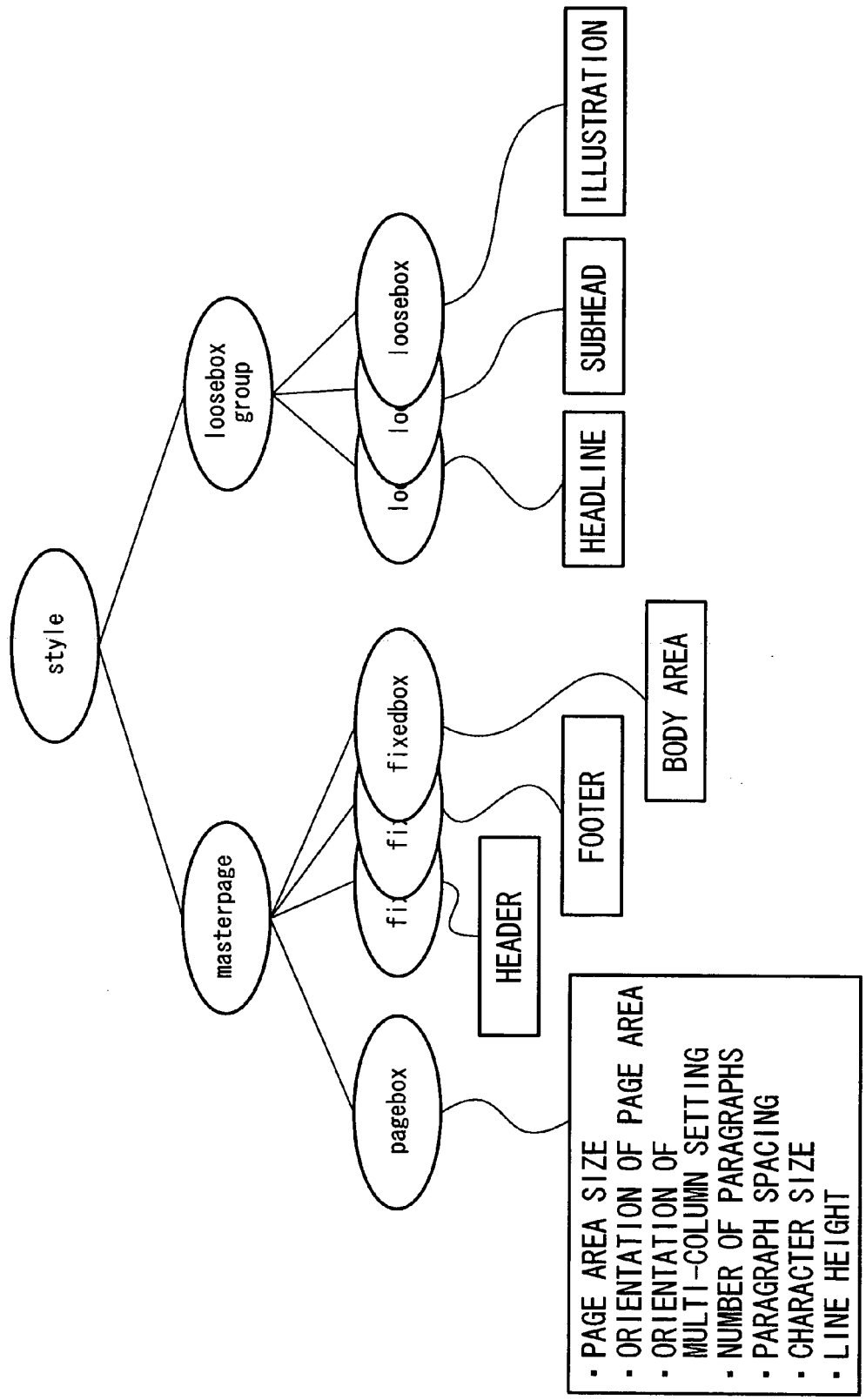
FIG. 2 is a schematic diagram illustrating an example of a structure of style definition.

FIG. 2 is a schematic diagram illustrating an example of a structure of a style definition. This style definition has two nodes: the "masterpage" and the "looseboxgroup" nodes. The "masterpage" node describes parameters specifying a page structure of this structured document. This "masterpage" node may includes two types of nodes: the "pagebox" node and the "fixedbox" nodes. The "pagebox" node describes the area in which the structured document is displayed, and more specifically it defines the size of an area in which the structured document is displayed, i.e., a page area, (page area size) and the position at which the page area is placed in a viewing area (page area layout position).

A "fixedbox" nodes describe the size and position of a rectangular area placed in the page area which is described in the "pagebox" node. More than one rectangular area, such as a header area, a footer area and a body text area, can be described so as to define the whole page. One of the rectangular areas described by the "fixedbox" nodes can have an attribute of "body area". A body area is an area in which the body texts are placed, and is usually the area in which contents of the structured document are placed. Furthermore, information described in the "pagebox" node includes the orientation of columns (vertical setting or horizontal setting), the number of columns for describing the body text, the orientation of multi-column setting, the number of paragraphs, the size of the spacing between columns (column spacing), the character size used in the body text, or the spacing between lines (line height).

A "looseboxgroup" node is used to define a layout area which has a different appearance than that of the body text. In other words, the "looseboxgroup" node describes a layout area in which an element is displayed differently from elements on the body text, and this "looseboxgroup" is expressed in terms of a size of characters displayed in the body text area. FIG. 3 is a table listing an example of a description of such a layout area. In this table, the "h1" element, the "h2" element, and the "img" element correspond to a headline, a subhead, a paragraph, and an illustration, respectively. The "Area Size" column lists the size of each area defined using the number of characters as a basic unit. The "Adjusted Character Number" column lists the number of characters which can be accommodated in each area. Those numbers are, however, not the actual numbers of characters in the respective areas since the different areas contain texts in different sizes. Therefore, those numbers are the adjusted numbers which are determined using the size of the body text area as a basic unit.

Referring again to FIG. 1, the structured document storage unit 22 stores a structured document received by the communication unit 10. This structured document is, for example, described using XML.

Figure 4:
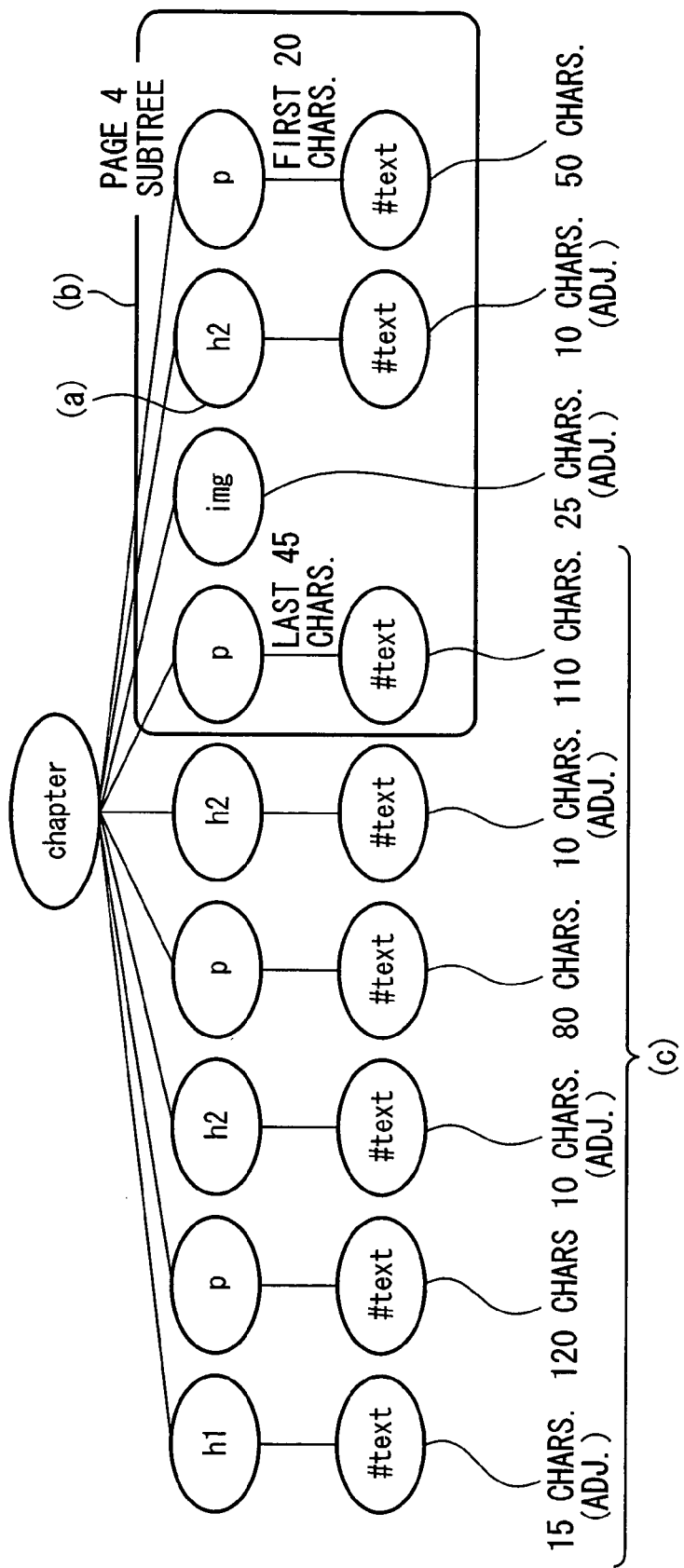
FIG. 4 is a schematic diagram illustrating an example of a structure of a structured document.

FIG. 4 is a schematic diagram illustrating an example of a structure of a structured document. In this figure, the "h1" element, the "h2" elements, the "p" elements, and the "img" element each refer to a headline, subheads, paragraphs, and an illustration, respectively. A "p" element has a "#text" which defines format information for displaying as a body text.

Furthermore, the "h1", "h2", and "img" elements are respectively assigned style definition to specify size of the area, as shown in FIG. 4.

A page character number calculating unit 30 shown in FIG. 1 calculates the number of characters which can be accommodated in one page based on information included in the style definition which can be used to determine this value. Hereinafter, the number of characters which can be accommodated in one page is called the "page character number". In this example, the line length, the number of lines which can be accommodated in one column, the number of characters which can be accommodated in one line ("line character number"), the number of characters which can be accommodated in one paragraph ("paragraph character number"), and the number of characters which can be accommodated in one page ("page character number") are calculated based on the size of body area specified in the "fixedbox" node, and the orientation of multi-column setting, the number of paragraphs, the column spacing, the character size, and the line height which are specified in the "pagebox" node.

The page layout processing unit 40 determines a page layout based on the style definition. For example, the page layout processing unit 40 determines a page layout according to the result obtained by the page character number calculating unit 30.

Figure 5:
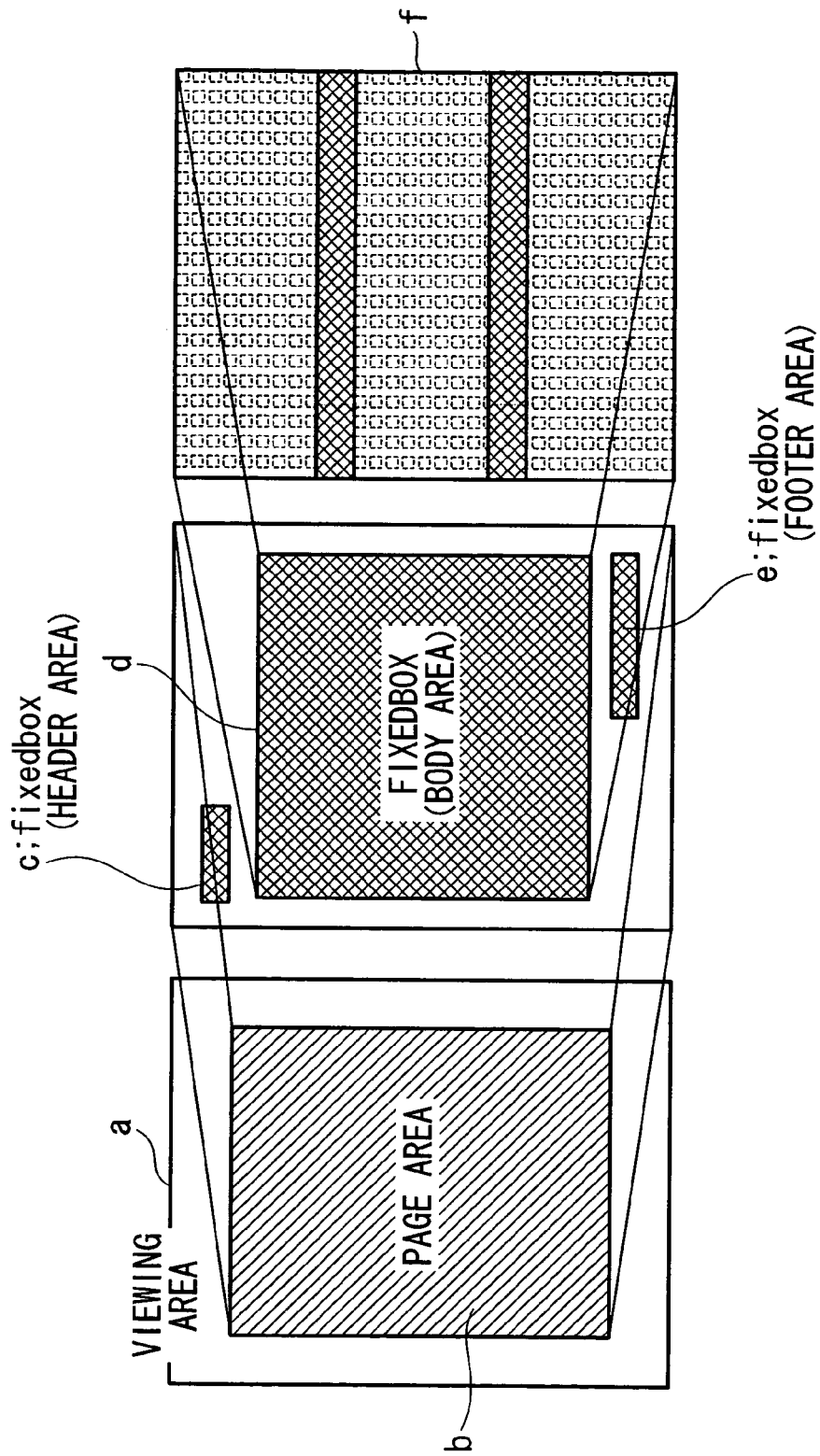
FIG. 5 is a schematic diagram illustrating an example of a page laid out by a page layout processing unit 40.

FIG. 5 is a schematic diagram illustrating an example of a page laid out by a page layout processing unit 40. In this figure, a page area (represented by reference symbol "b"), is allocated according to the description of the "pagebox" node in a viewing area (represented by reference symbol "a"). In the page area, a header area (represented by reference symbol "c"), a body area (represented by reference symbol "d"), and a footer area (represented by reference symbol "e") are allocated according to the descriptions of the respective "fixedbox" nodes. Furthermore, the line length, the number of lines, the line character number, the paragraph character number, and the page character number for the body area are determined according to the descriptions of the "pagebox" node (e.g., the orientation of multi-column setting, the number of paragraphs, the column spacing, the character size, and the line height), and the layout of body text is determined (represented by reference symbol "f").

Figure 6:
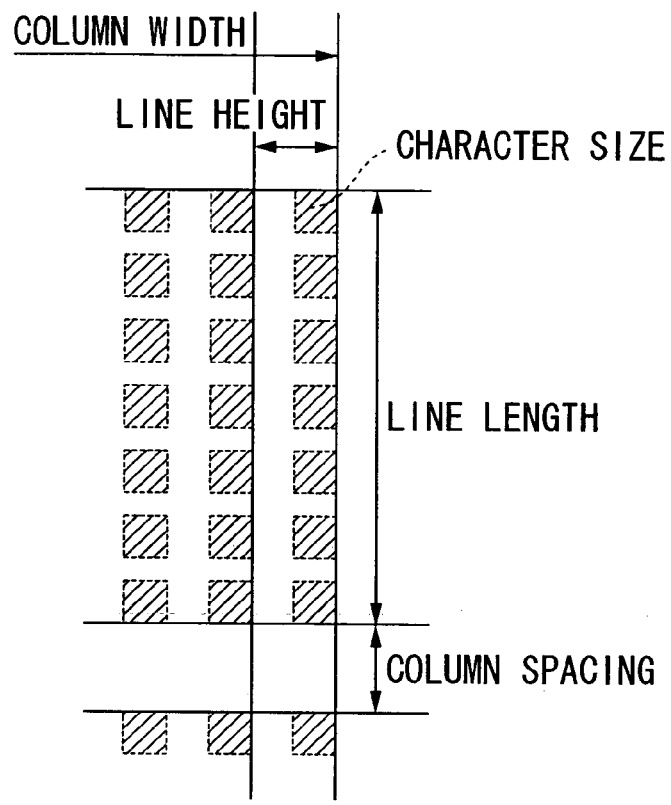
FIG. 6 is a schematic diagram illustrating an example of layout of body texts in one column in the body area.

FIG. 6 is a schematic diagram illustrating an example of layout of body text in one column in the body area. As shown in this figure, the width of the column (column width), the line height, the character size, the line length, and the column spacing are determined for this column.

A cumulative character count calculating unit 50 calculates the cumulative number of characters to the requested element. This calculation is carried out by calculating the cumulative number count of characters from the beginning of the structured document to the character to be displayed.

A requested page determining unit 60 determines the page which includes the requested element according to the page character number obtained by the page character number calculating unit 30 and the cumulative character count calculated by the cumulative character count calculating unit 50.

A subtree extracting unit 70 examines the structured document, and extracts a subtree of the page including the requested element, which has been determined the requested page determining unit 60.

A layout processing unit 80 determined a layout of the page including the requested element according to the subtree which has been extracted by the subtree extract unit 70 the style definition. In addition, the layout processing unit 80 generates a layout area according to the description of the "loosebox" nodes, and places the layout area on the page laid out by the page layout processing unit 40.

Figure 7:
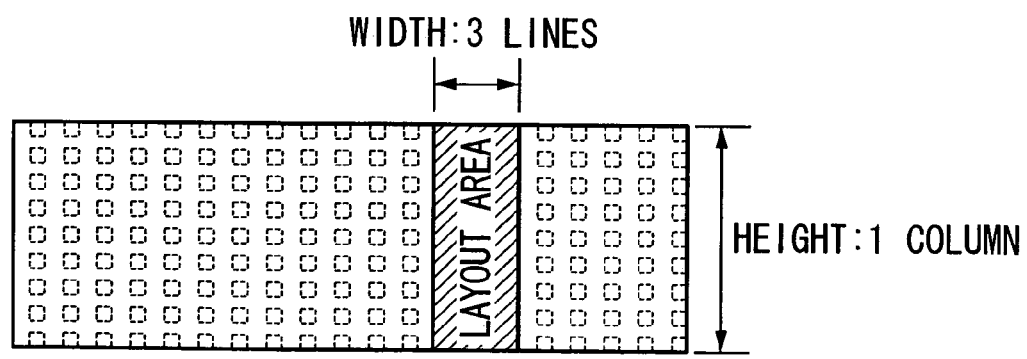
FIG. 7 is a diagram showing an example in which a layout area is disposed in a part of a description of body texts.

FIG. 7 is a diagram showing an example in which a layout area is placed in the body text. In this example, the height of the layout area equals to the height of the column, and the width of one line of the layout area is three times that of the body text.

The display unit 3 displays the requested page which has been laid out by the layout processing unit 80 to a display medium. The display unit 3 can receive various input via a touch panel. It should be noted that other input means, such as a numeric key or a cross key, may be employed instead of touch panels.

It should also be noted that the page character number calculating unit 30, the page layout processing unit 40, the cumulative character count calculating unit 50, the requested page determining unit 60, the subtree extracting unit 70, and the layout processing unit 80 may be implemented using special purpose hardware. Alternatively, they may includes a memory and a central processing unit (CPU), and the functionalities thereof may be implemented by a program which is loaded to the memory and executed by the CPU.

Figure 8:
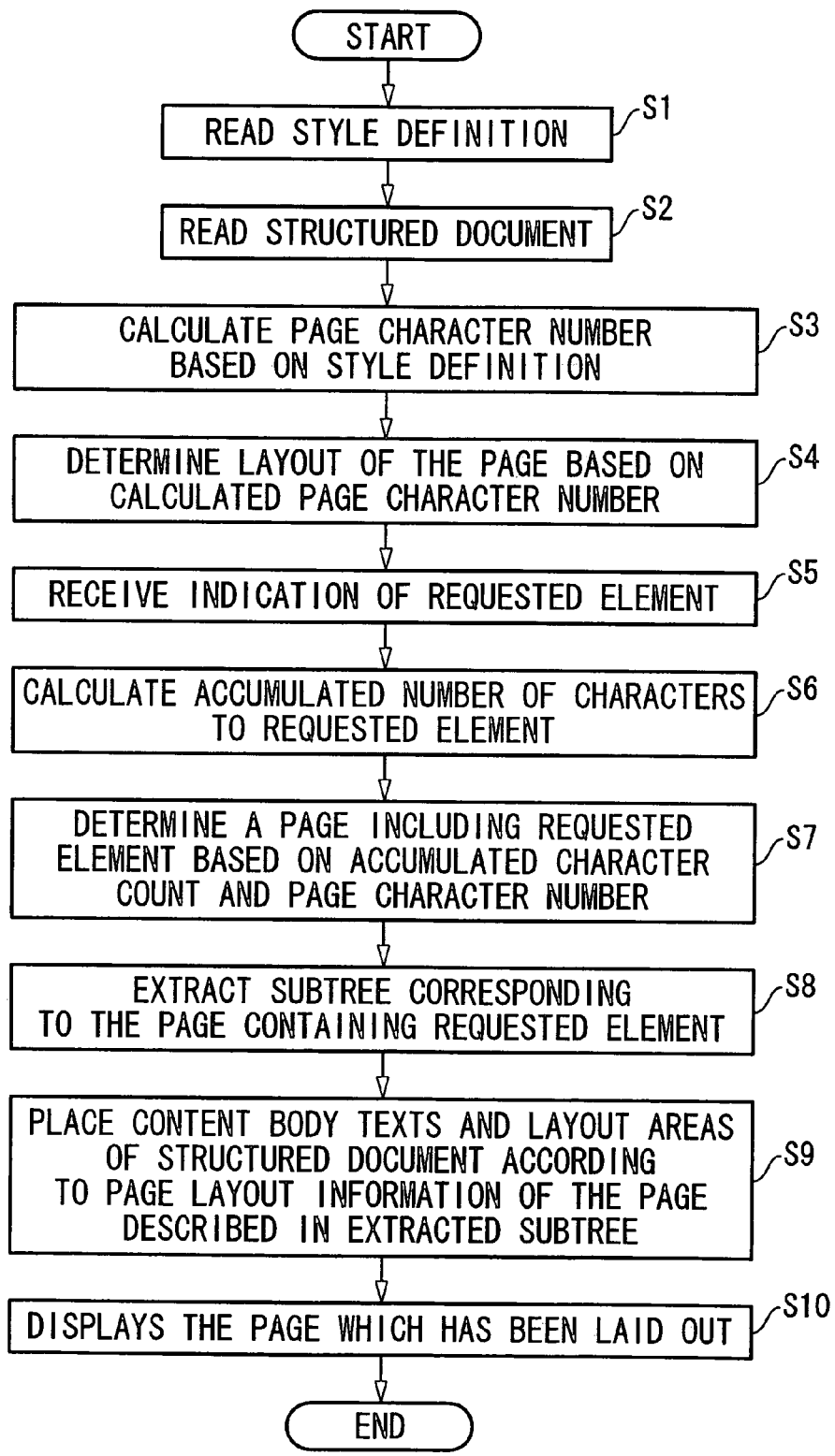
FIG. 8 is a flowchart illustrating the operation of the structured document display processor shown in FIG. 1.

Next, the operations of the structured document display processor shown in FIG. 1 will be explained with reference to a flowchart in FIG. 8. In this example, it is assumed that a style definition and a structured document has been downloaded by the communication unit 10, and the style definition has been stored in the style definition storage unit 21, and the structured document has been stored in the structured document storage unit 22.

First, the page character number calculating unit 30 loads the style definition from the style definition storage area 21 (Step S1), and the cumulative character count calculating unit 50 loads the structured document from the structured document storage unit 22 (Step S2). The page character number calculating unit 30 calculates a page character number based on the obtained style definition (Step S3). The page layout processing unit 40 determines a layout of the page according to the obtained page character number (Step S4).

Then, an indication which indicates which page a user of this device desires to read is received from a user via a touch panel, and this information is output to the cumulative character count calculating unit 50 as an indication for the requested element (Step S5). The cumulative character count calculating unit 50 counts a accumulated number of characters from the beginning of the structured document to the requested element to obtain a cumulative character count (Step S6). The requested page determining unit 60 determines a page which includes the requested element by dividing the cumulative character count obtained using the cumulative character count calculating unit 50 by the character number in one page obtained using the page character number calculating unit 30 (Step S7).

Once the page which includes the requested element is determined, the subtree extracting unit 70 extracts a subtree corresponding to this page (Step S8). Once the subtree is extracted, the layout processing unit 80 places the body texts and layout areas of the structured document according to the page layout definition of this page described in the extracted subtree (Step S9). The display unit 3 displays the page which has been laid out by the layout processing unit 80 (Step S10)

Figure 9:
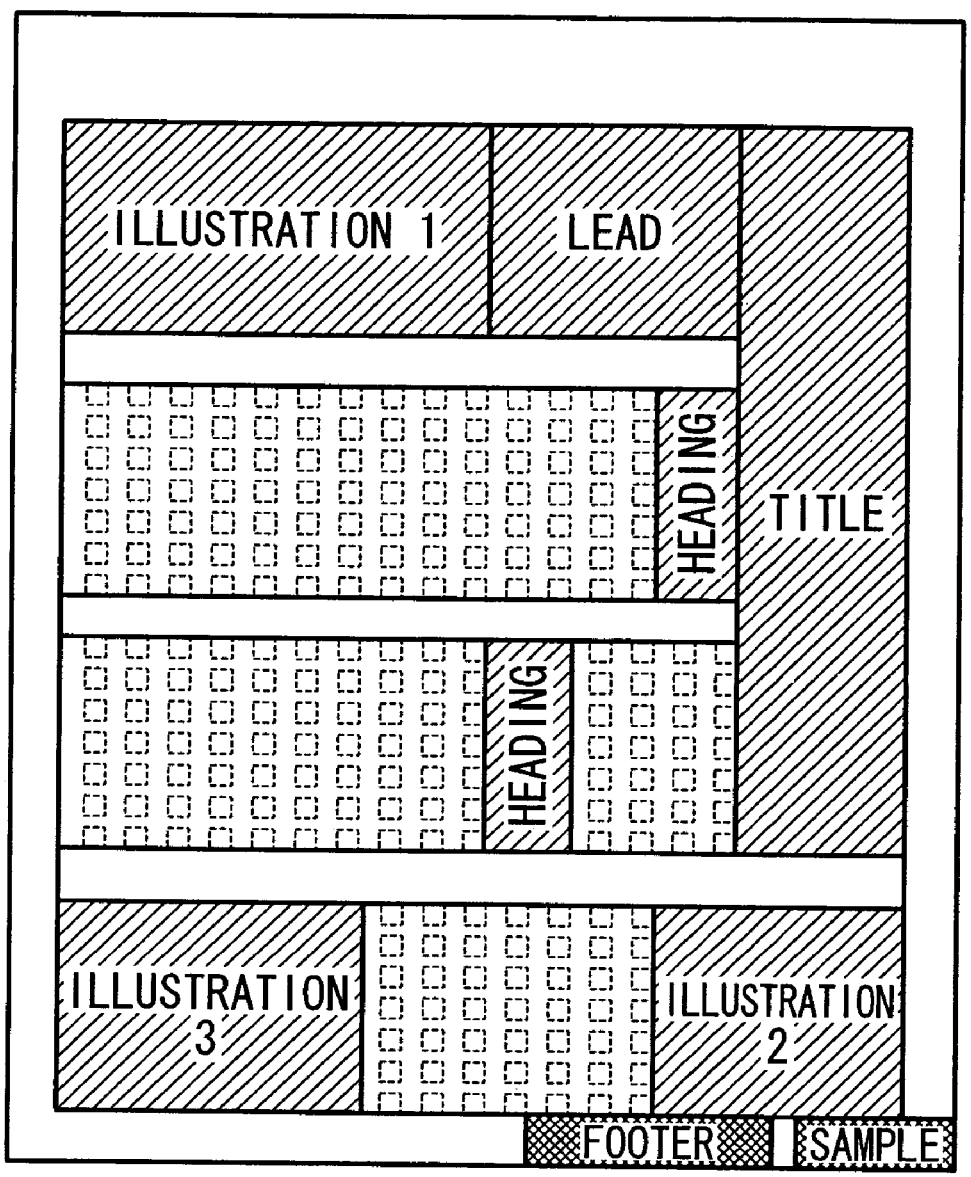
FIG. 9 is a schematic diagram illustrating an example of the structured document displayed on a display unit 3.

Following the above-described procedure, a title, illustrations (images), headings, and body texts, for example, of the structured document are laid out and displayed as shown in FIG. 9.

Next, an alternative embodiment of the present invention will be explained with reference to FIG. 4. In this example, a user desires to see the "h2" element denoted by the reference symbol "a" in a structured document shown in FIG. 4, and instructs the device to display the "h2" element via the touch panel. It is assumed that the page layout processing unit 40 has been set for the number of paragraphs to two, the line character number to five, the number of lines in a column to ten, and the page character number to 100, for example. The cumulative character count from the beginning of the structured document to the "h2" element is determined to be 370 by calculating the total number of characters of the elements enclosed by the parenthesis (c). The page having the requested "h2" element is determined to be the fourth page by dividing 370 by 100 (370/100=3.7). A subtree corresponding to the fourth page is determined to be an area denoted by reference symbol (b) since the fourth page contains characters from the 401st character to the 500th character. In this example, the "h2" element is displayed on the fourth page together with the last 45 characters from the first "p" element in this subtree and 20 characters from the last "p" element in this subtree. It is considered that the "img" element is counted as 25 characters since it has been defined that the adjusted character number of the "img" element is 25.

In the above-mentioned embodiments, the style definition is described as being downloaded. It should also be noted, however, that a plurality of style definitions may be stored in the style definition storage area 21 in advance, and a user may select a desired one from the style definitions, and a structured document may be displayed according to the style definition of choice. Furthermore, a single style definition may be stored as a default style, and a user may customize the default style.

If a structured document is written in any European language, such as English or German, the cumulative character count calculating unit 50 may execute hyphenation, justification, or any other operation which is required to process text of a European language.

It should be noted that at least one computer program for implementing the functionalities of the display unit 3, the communication unit 10, the page character number calculating unit 30, the page layout processing unit 40, the cumulative character count calculating unit 50, the requested page determining unit 60, the subtree extracting unit 70, and the layout processing unit 80 shown in FIG. 1 may be stored in a computer-readable storage medium, and the programs may be loaded to and executed by a computer. As used herein, the term "computer system" is not limited to a computer, but includes an operating system and hardware, such as a peripheral device.

Furthermore, if a "computer system" utilizes a world wide web (WWW) system, the computer system may include web providing environment (or web browsing environmental).

In addition, the term "the computer-readable storage medium" refers to a storage, such as a removable medium (e.g., a flexible disk, a magneto-optical disk, a ROM, a CD-ROM), or a storage device, such as a hard disk, which is installed into a computer system. Furthermore, the term "computer-readable storage medium" includes a medium which can dynamically retain a program in a short term, for example, a communication line over which the program is sent via a communication network (e.g., a network or a telephone line). Alternatively, it may be a medium which can store a program during a certain period of time, such as a volatile memory in a computer system which is capable of being a server or a client when a program is transmitted via a network. In addition, the above-described program may execute only part of the functionalities mentioned above, and the functionalities may be implemented in conjunction with a program which has already been stored into a computer system in advance.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A structured document display processor used in a display device for displaying a structured document based on a style definition, the structured document having at least one element, the structured document display processor comprising:
  a page number calculating unit for calculating a page character number based on information used for determining the page character number, the information for determining the page character number being defined in the style definition, the page character number indicating the number of characters which can be accommodated in a single page;
  a cumulative character count calculating unit for calculating a cumulative character count which is a total character count from the beginning of the structured document to a requested element which is requested to be displayed;
  a requested page determining unit for determining a page containing the requested element, based on the page character number obtained by the page number calculating unit and the cumulative character count obtained by the cumulative character count calculating unit, by dividing the cumulative character count by the page character number;
  a subtree extracting unit for examining the structured document and extracting a subtree corresponding to the page containing the requested element determined by the requested page determining unit;
  a layout processing unit for determining a layout of the page containing requested element according to the subtree extracted by the subtree extracting unit and the style definition, the layout processing unit determining the layout of the page without having to process the entire structured document; and
  a displaying unit for displaying the structured document based on the style definition.

2. The structured document display processor according to claim 1, wherein a part of the at least one element is displayed in a body text area, the style definition includes a definition of a layout area in which another part of the at least one element is displayed differently from the body text, and a size of the layout area is expressed in terms of a size of characters displayed in the body text area.

3. A method for structured document display processor used in a display device for displaying a structured document based on a style definition, the structured document having at least one element, the method comprising the steps of:
  calculating a page character number based on information used for determining the page character number, the information for determining the page character number being defined in the style definition, the page character number indicating the number of characters which can be accommodated in a single page;
  calculating a cumulative character count which is a total character count from the beginning of the structured document to a requested element which is requested to be displayed;
  determining a page containing the requested element, based on the page character number and the cumulative character count, by dividing the cumulative character count by the page character number;

examining the structured document and extracting a subtree corresponding to the page containing the requested element;

determining a layout of the page containing requested element according to the subtree extracted by the subtree extracting unit and the style definition without having to process the entire structured document; and displaying the structured document based on the style definition.

4. A program for structured document display processor used in a display device for displaying a structured document based on a style definition, the structured document having at least one element, the program being executed by a computer, comprising the steps of:

calculating a page character number based on information used for determining the page character number, the information for determining the page character number being defined in the style definition, the page character number indicating the number of characters which can be accommodated in a single page;

calculating a cumulative character count which is a total character count from the beginning of the structured document to a requested element which is requested to be displayed;

determining a page containing the requested element, based on the page character number and the cumulative character count, by dividing the cumulative character count by the page character number;

examining the structured document and extracting a subtree corresponding to the page containing the requested element;

determining a layout of the page containing requested element according to the subtree extracted by the subtree extracting unit and the style definition without having to process the entire structured document; and displaying the structured document based on the style definition.

* * * * *